United States Patent [19]
Neelakantan

[11] Patent Number: 6,129,897
[45] Date of Patent: Oct. 10, 2000

[54] FUEL ENERGY SAVING AND POLLUTION CONTROL DEVICE

[75] Inventor: Kameswaran Neelakantan, Chennai, India

[73] Assignee: Gem Energy Industry Limited, Chennai, India

[21] Appl. No.: 08/999,921

[22] Filed: Dec. 29, 1997

[30] Foreign Application Priority Data

Jun. 20, 1997 [IN] India .............................. 1344/MAS/97

[51] Int. Cl.⁷ ....................................................... B01J 8/18
[52] U.S. Cl. ......................... 422/139; 422/177; 422/145; 422/168; 422/211; 422/234
[58] Field of Search .................... 422/139–143, 422/145, 168, 169, 177, 171, 211, 216, 234

[56] References Cited

U.S. PATENT DOCUMENTS 4,504,459   3/1985   Stothers .............................. 423/576.2

*Primary Examiner*—Marian C. Knode
*Assistant Examiner*—Alexa A. Doroshenk
*Attorney, Agent, or Firm*—Ladas & Parry

[57] ABSTRACT

A pollution control and fuel energy saving device for use in boilers and furnaces which includes a container for a catalyst. The catalyst contains *Aegle marmelos* and *Ocimum basilicum*. The device may contain a backup container that is used to maintain the level of the catalyst in the container.

6 Claims, 5 Drawing Sheets

FUEL ENERGY SAVING AND POLLUTION CONTROL DEVICE

The present invention relates to a herbal catalytic composition and device to be used for fuel conservation and pollution control.

The present invention relates to a herbal catalytic composition useful in energy conservation, fuel conservation and pollution control where nitrogen oxides are converted to nitrogen in a catalytically promoted reaction. The subject invention therefor relates to a catalyst composition which may be employed in removing or eliminating nitrogen oxides from fuel gas streams generated by boilers and furnaces consuming hydrocarbonaceous material as fuel.

BACKGROUND OF THE INVENTION

One of the major drawbacks existing in furnaces and boilers is the basic problem of the combustion process, which requires a lot of air in all the parts of the combustion chamber to ensure complete combustion. Insufficient air results in incomplete combustion and the production of unburnt carbon which appears as black smoke. However, the use of excess air is likely to cause inefficient operation by chilling the flame and removing heat unnecessarily as sensible heat in the surplus air. In such circumstances the exhaust gases contain both free carbon and combustible gases and results in the potential waste of heat and energy.

Secondly, the exhaust gases result in the formation of a layer on the top of the furnace or boiler.

Those skilled in the art of pollution control are familiar with many catalysts developed for the direct reduction of nitrogen in fuel gas streams. Several such catalysts are available commercially. A common feature of such catalysts is for the reduction of nitrogen oxides.

In the production of alloys metal is added first and subsequently after the metal melts other metals and chemicals are added to form the resultant product. During the melting period, pure oxygen is lanced inside the furnace through electrical resistance welded pipes with considerable pressure to quicken the process of melting.

For such operations, liquid oxygen in a considerable quantity with reference to the capacity of the furnaces is to be stored.

In the existing furnaces, the operation of the lancing of oxygen is purely manual since the welded pipes are introduced manually inside the furnaces up to the melting point of the metals which are already fed in the furnaces. Hence, it is impossible for humans beings to be nearer to the hot furnace due to the high temperature and unbearable heat and light. The lancing operation is always intermittent and not continuous which is required for quicker composition of the alloy at the melting time. Due to this, the melting time increases and due to the intermittent operation which is not continuous, the resultant alloy does not get the required technical specification of the correctly mixed alloy compound.

In the case of the steel and petrochemical industries, molecular nitrogen from the atmosphere dissociates into its atomic form and is readily absorbed into the heated steel reducing its formability. This makes it unusable for applications requiring a high degree of ductility. To produce steel that can be deeply pressed over dies, the nitrogen level must be reduced to about 30–50 PPM.

It has been found that in the conventional steel making processes the largest amount of nitrogen is absorbed by steel during initial melting and that nitrogen levels are reduced when oxygen is injected into liquid steel to react into carbon. Specifically carbon monoxide formed during this reaction tends to flush out the nitrogen. The presence of foamy slag covering the molten metal reduces the chances for more nitrogen to be absorbed. This foam is produced when carbon dioxide gases from the steel bath form small bubbles within the slab; it has the consistency approximately of the foam that forms on the top of a carbonated beverage.

The biggest problem faced by the present industries is the problem of high energy cost and metallurgical loss. Another major problem is pollution.

Similarly, liquified petroleum gas (LPG) is a common and essential domestic commodity and is used in many homes.

It has been found that the combustion of fuel gases (commercial/domestic) is found to be more easily controllable than that of solid fuel because the mixing of fuel and the combustion air can be controlled more perfectly. The ease of achieving complete combustion with the little excess air is somewhat less with fuel gases consisting predominantly of hydrocarbons in the case of LPG than it is with gas mixtures containing substantial proportions of hydrogen and carbon monoxide.

The mixture of combustible gas cannot be ignited, nor can it be burn if the proportion of combustible gas which it contains is either very small or unduly large. However, it does not mean that the gases cannot be oxidized by heating the mixture.

The LPG which is used domestically in cylinders is under relatively low pressure. The largest part of the LPG produced is used in central heating systems and the next largest as raw material for chemical plants.

SUMMARY OF THE INVENTION

The catalyst of this invention overcomes the disadvantages present in prevailing systems and use of the catalyst has resulted in the drastic reduction of carbon monoxide emissions.

The object of the present invention lies in the catalytic composition and the use thereof.

Another object of the present invention is that by the use of the catalyst the system is not plugged by soot or ash or other particulate matter present in the gas stream.

Another important object of the present invention is that, the use of the present system is totally a pollution free system as the catalyst is totally a bioproduct.

Still another object of this invention is a device that can be used to control pollution and conserve fuel.

DETAILED DESCRIPTION OF THE INVENTION

Figure 1:
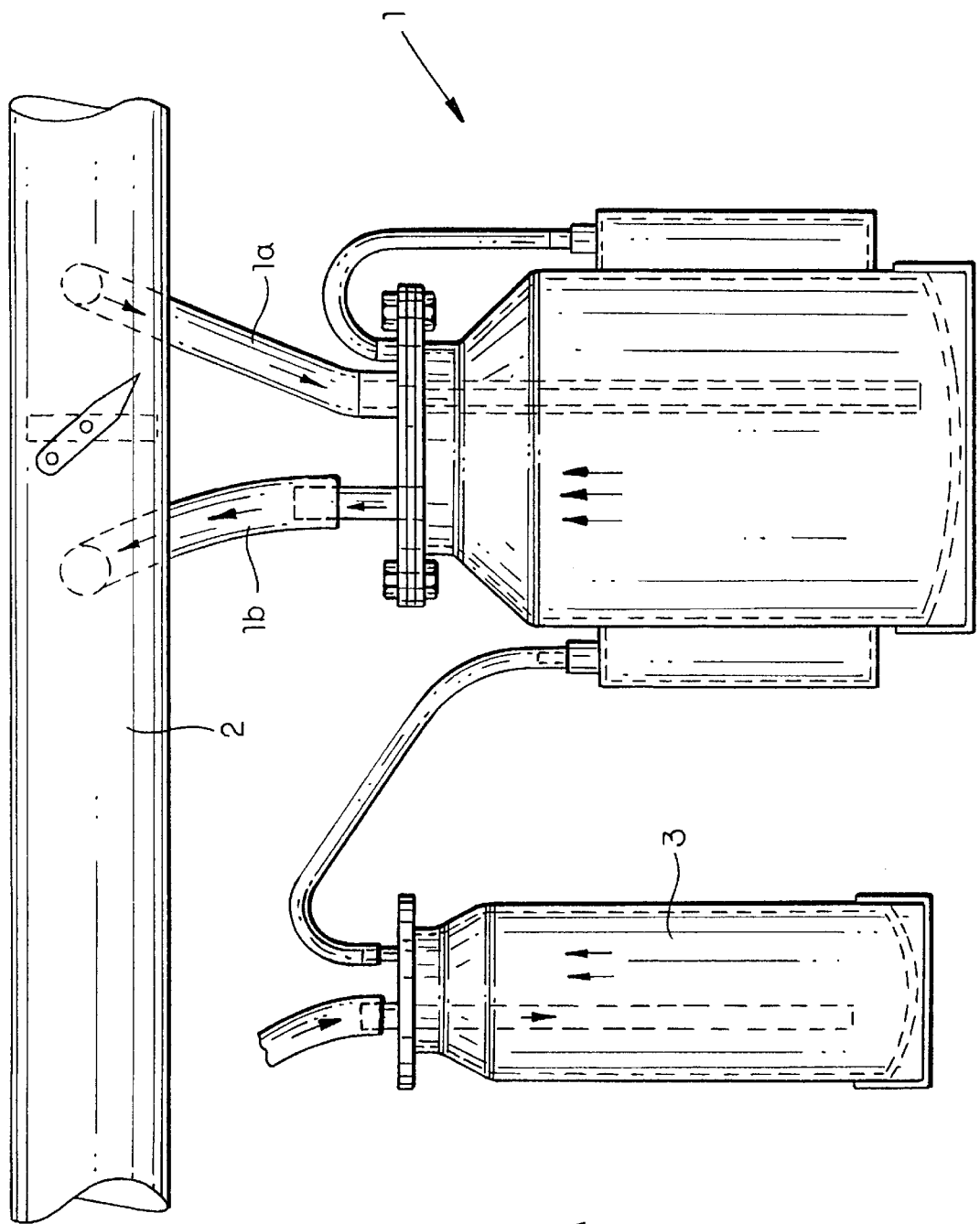
FIG. 1 depicts the flow diagram of the fuel saving device for boilers and furnaces.

A catalyst has been found to catalyze combustion reactions so as to reduce smoke and carbon formation in both industrial and domestic appliances and when used with LPG.

In the case of the steel industry it has been found that the present invention has resulted in a saving of fuel energy by reducing melting time cycle by 20% which ultimately results in the saving of fuel consumption by about 20%. It has also resulted in the elimination of oxygen from the system.

The most important object of the present invention is the saving of fuel energy by reducing melting time cycle by 20% which ultimately results in the saving of electric consumption by 20%.

Electric arc furnaces, are used mainly for melting scrap metal, and other metals and chemicals can be added to produce alloys. By the introduction of the catalyst of this invention, the process of introduction of oxygen in the process of melting has been eliminated. It also eliminates the manual labor since the catalyst is introduced inside the furnace through an accessory/device designed and fabricated to the furnace's capacity through which the catalyst is fed.

The device functions by injecting the catalyst inside the furnace without any contact with the atmospheric air.

The catalyst accelerates melting and the temperature inside the furnace is maintained as required for mixing of all the metals and chemicals so that the resulting alloy combination is of the highest grade and required technical standard.

The naturally available herbs to be used in combination to act as a catalyst are from the species *Aegle mamelos* and *Ocimum basilicum*. It is preferred that in the catalyst, the combination of the two herbs is in the ratio of Aegle:Ocimum 40:60. It is preferred that the leaves of the herbs are used to prepare the catalyst. The present invention relates to a herbal catalytic composition for controlling pollution and saving fuel energy, comprising:

from about 35–45 weight % of *Aegle marmelos* and from about 55–65 weight % of *Ocimum basilicum*.

The naturally occurring herbs are collected and processed. The leaves of the herbs are plucked and soaked in water for a time period of about two or three days. The soaking results in fungal growth on the leaves. The mixture of leaves and fungus are ground in a conventional manner to make a homogenous paste having 300–400 mesh particle size. After the homogenous catalytic mixture is prepared, it is first heated preferably in an open vessel and then it is boiled at a boiling temperature for 20–40 minutes, preferably in an open atmosphere. 3–5% of the mixture is then evaporated. After the evaporation, about 25% more water is added to the mixture. The catalytic mixture is then heated for some time. After heating the mixture is allowed to cool to ambient temperatures. This results in the catalytic mixture being concentrated. If necessary, during the preparation of the catalyst mixture, the mixture can be filtered to remove waste and extraneous materials.

To use the concentrated catalytic mixture, water must be added. The quantity of water added should be ten times the amount of concentrated catalytic mixture, the ratio of concentrated herbal catalytic mixture to water is 1:10.

The herbal catalyst so prepared has a shelf life of more than a year. The present composition is a 100% herbal composition, no synthetic chemicals are used even as preservatives. The constituents of the present composition themselves act as preservatives. The present invented catalyst is eco-friendly and bio-degradable. It is highly economical as all the constituents are naturally occurring and are found in abundance.

DETAILED DESCRIPTION OF THE DRAWINGS

FIG. 1 relates to boilers and furnaces where the catalyst container (1), is filled with the catalyst up to 5–12%. The catalyst container (1) has one inlet (1a) and one outlet (1b). The air available in the air duct (2) is sucked partially through the inlet (1a) of the container. The air is circulated through the catalytic chamber containing the catalyst and passes to the air duct (2) via outlet (1b) to mix with the air present in the boilers. One backup capsule (3) is connected to the main unit of the container containing catalyst to maintain the required amount of the catalytic composition in the device. The container is filled up to the capacity of ⅓rd to ¼th of the catalytic composition.

Figure 2:
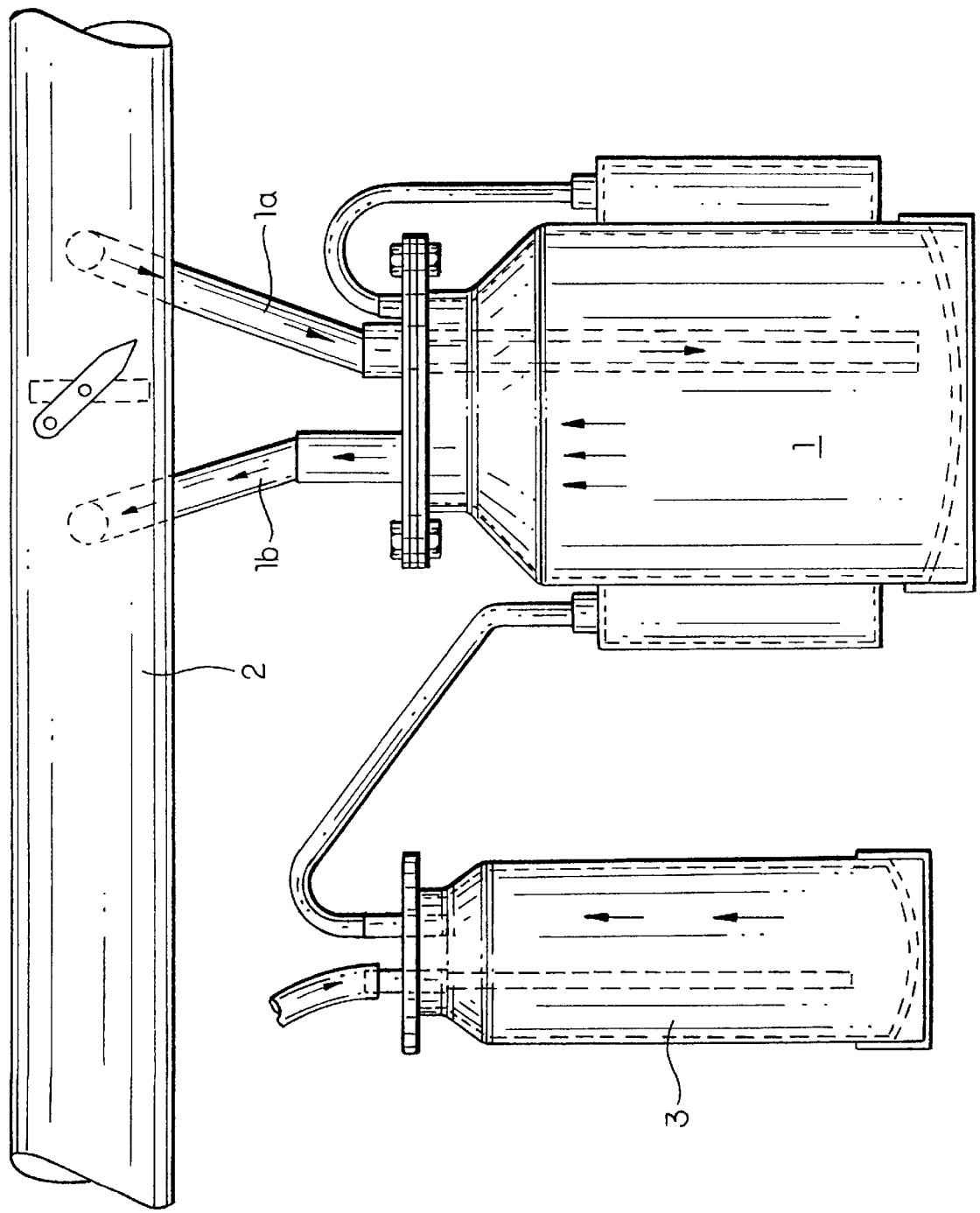
FIG. 2 depicts the flow diagram of the fuel saving device for electric-arc-furnaces.

FIG. 2 relates to an electric arc furnace wherein in the catalyst container (1), the catalyst is filled up to 5–12%. The catalyst container (1) has one inlet (1a) and one outlet (1b). The air is blown inside the catalytic chamber through inlet (1a) from the blower (4). The air is circulated through the catalytic chamber and then passes to electrode assembly of the electric arc furnace (5) via outlet (1b). Backup capsule (3) is connected to the main unit of the catalyst container (1) to maintain the required amount of the catalytic composition in the device. The container is filled up to the capacity of ⅓rd to ¼th of the catalytic composition.

Figure 3:
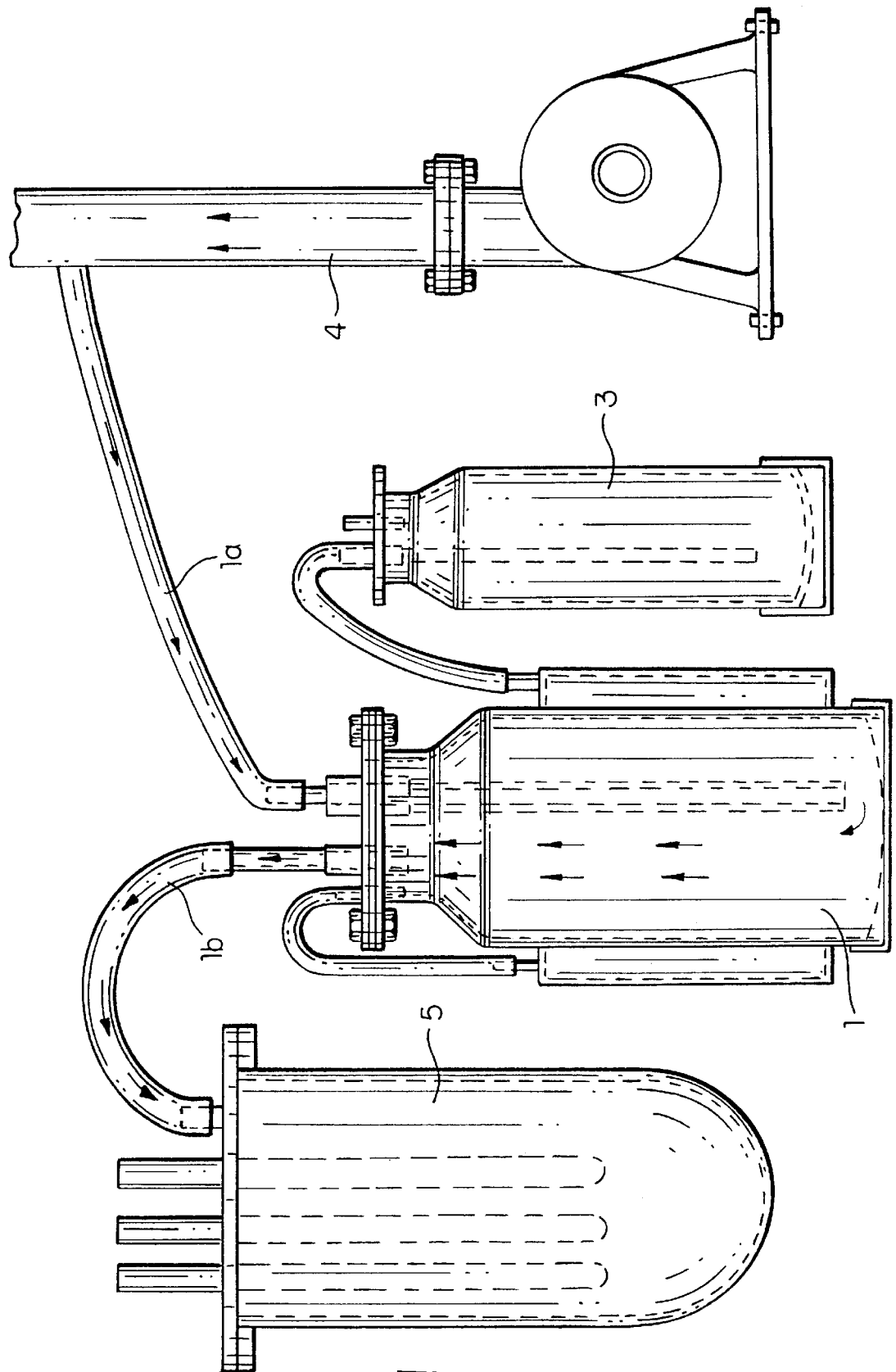
FIG. 3 depicts the flow diagram of the fuel saving device for the steel industry.

FIG. 3 relates to the steel and petrochemical industry where the catalyst container (1) is filled with catalyst up to 5–12%. The catalyst container (1) has inlets (6), (6a) and (6b) and outlets (7), (7a) and (7b). The air is sucked from the air duct (2) through inlets (6), (6a) and (6b), circulated through the catalytic chamber and then relet to airduct (2) via outlets (7), (7a) and (7b). The main unit consists of three inlets and three outlets. One backup capsule (3) with one inlet and one outlet is connected to the main unit to maintain the required amount of catalyst in the catalyst container.

Figure 4:
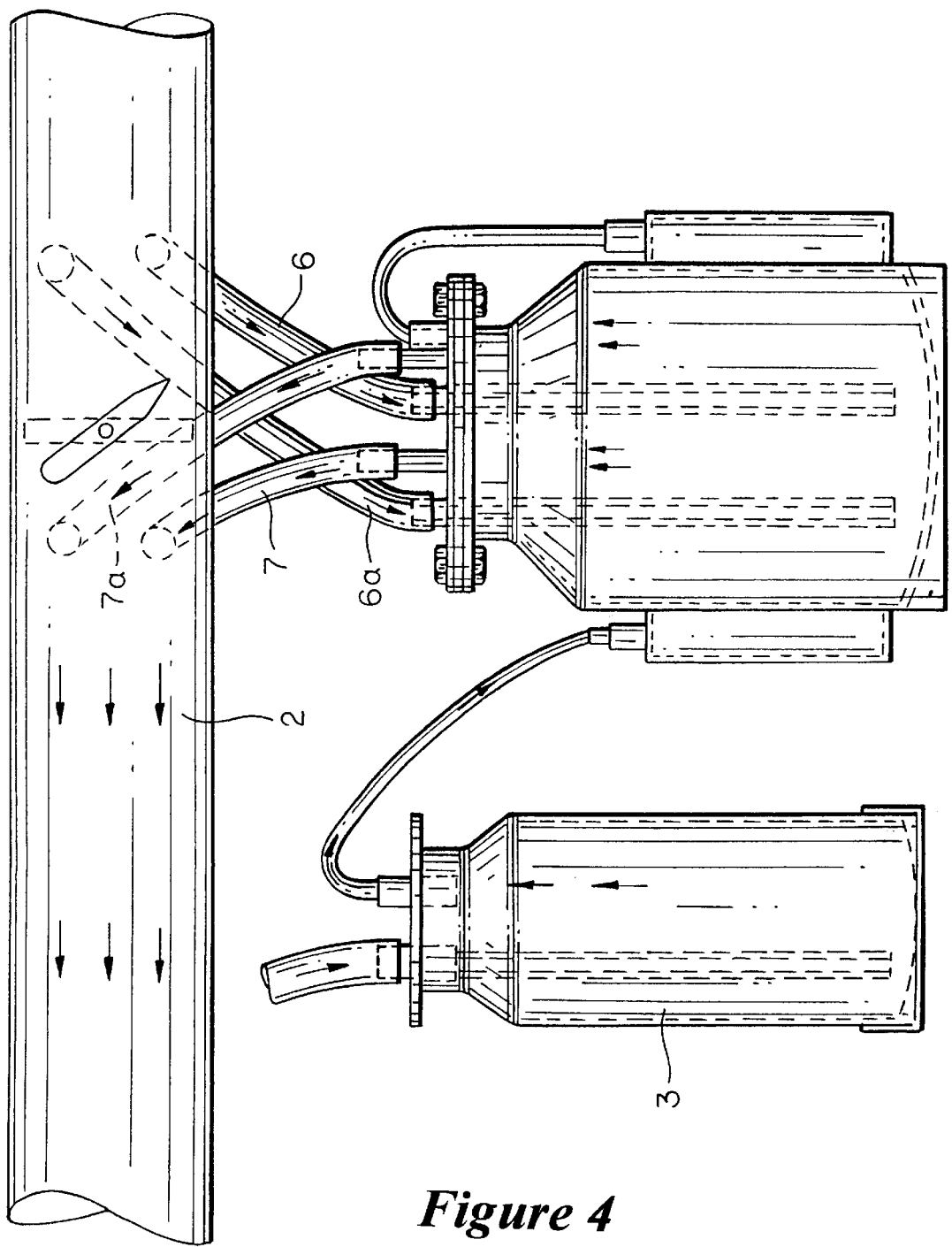
FIG. 4 depicts the flow diagram of the fuel saving device for the petrochemical industry.

FIG. 4 relates to the steel and petrochemical industry where the catalyst container (1) is filled with catalyst up to 5–12%. The catalyst container (1) has a pair of inlets (6) and (6a) and a pair of outlets (7) and (7a). The air is sucked from the air duct (2) through inlets (6) and (6a), circulated through the catalytic chamber and then relet to airduct (2) via outlets (7) and (7a). The main unit consists of two inlets and two outlets. One backup capsule (3) with one inlet and one outlet is connected to the main unit to maintain the required amount of catalyst in the catalyst container.

Figure 5:
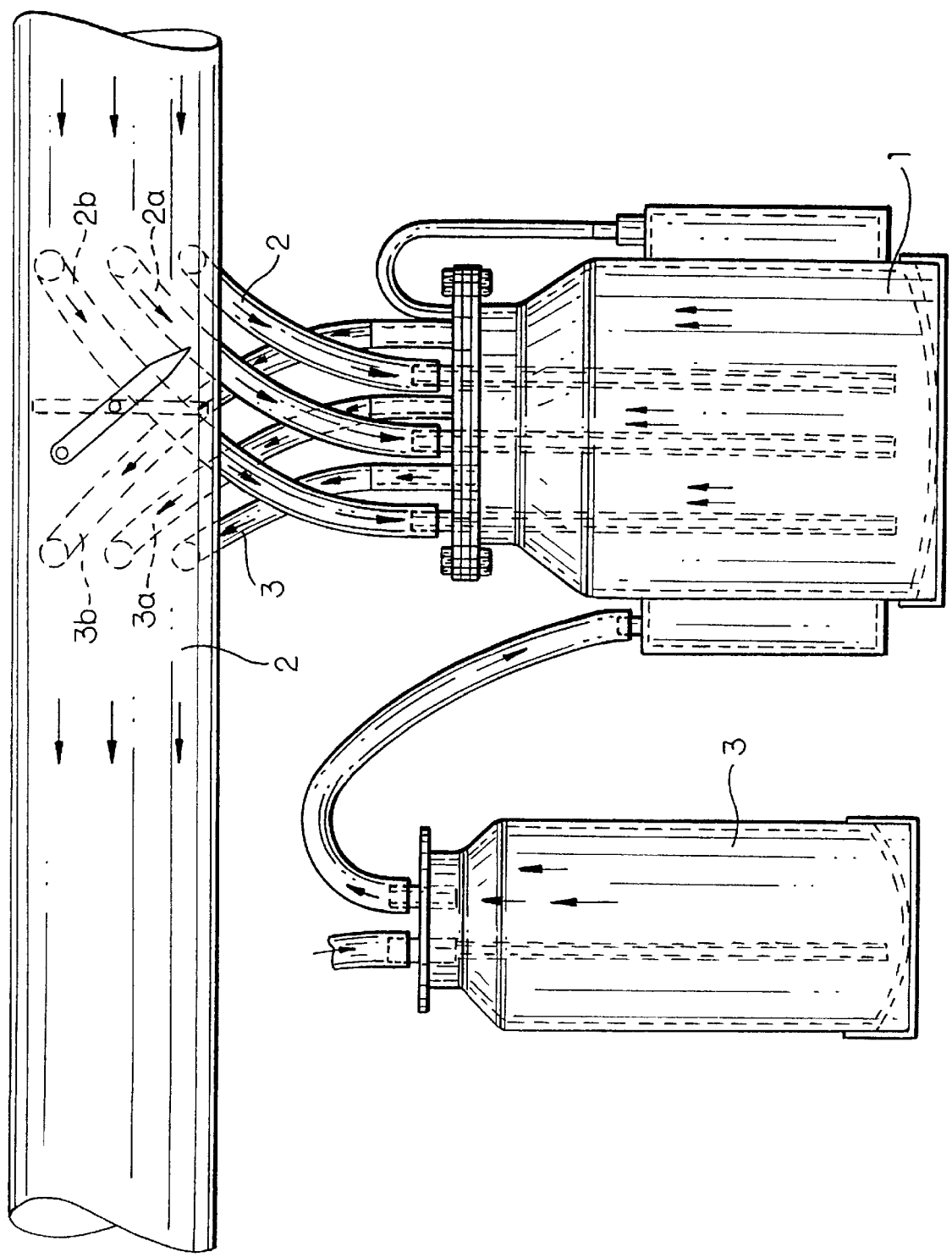
FIG. 5 depicts the flow diagram of the fuel saving device for LPG.

FIG. 5 relates to LPG where the catalyst container (1) has one inlet (1a) and one outlet (1b). The air is blown inside the catalytic chamber through inlet (1a), from the air duct (2). The air is circulated through the catalytic chamber and then relet to the air duct (2) via outlet (1b). Backup capsule (3) is connected to the main unit of the container containing catalyst to maintain the required amount of the catalytic composition in the device. The catalyst container is filled up to the capacity of ⅓rd to ¼th of the catalytic composition.

It is preferred that the devices of FIGS. 1–5 provide an air fuel ratio of 5% in volume.

The object of the present invention is that by the use of the catalyst the system is not plugged by soot, ash or other particulate matter present in the gas stream.

Thus the present invention is advantageous because of reduction of carbon monoxide emission wherein carbon monoxide emission is kept to a minimum, there is maximum burning of fuel, and no-scale formation in boilers and furnaces.

In an electric arc furnace, the present invention is advantageous because of elimination of the process of introduction of oxygen in the process of melting. It also eliminates manual labor as the catalyst is introduced inside the furnace. The invention reduces the melting time cycle by 20% which ultimately results in the saving of electric consumption by 20%. It totally avoids oxygen lancing and totally eliminates infrastructures required for lancing. It saves the human labor in such environment which is not a congenial environment for manual working.

In the steel industry, the present invention is advantageous because of the elimination of nitrogen which is mainly responsible for creating scaling, and the present catalytic composition acts as a shield during combustion. Besides this the foaming substance created by carbon dioxide is also eliminated, there is maximum burning of fuel, and no-scale formation. The present invention results in minimizing the loss of metal due to the slag and scaling.

What is claimed is:

1. A pollution control and fuel energy saving device for use in boilers and furnaces comprising a catalyst container having a top and a bottom containing a catalyst composition said catalyst comprising:

from about 35–45 weight % of *Aegle marmelos* and from about 55–65 weight % of *Ocimum basilicum;* said container having an inlet and an outlet, means for drawing air from an air duct through the inlet into the catalyst container, means for circulating the air in the catalyst container and means for passing the air from the catalyst container through the outlet to the air duct and means for maintaining an amount of catalyst in the container wherein the amount is ¼ to ⅓ of the volume of the container.

2. The device as claimed in claim 1 wherein the level of catalyst in the catalyst container is maintained by a backup capsule.

3. The device as claimed in claim 1 wherein the catalyst composition comprises *Aegle marmelos* and *Ocimum basilicum* ground to 300 to 400 mesh size particle.

4. The device as claimed in claim 1 wherein the catalytic composition is diluted by adding water in the ratio of catalytic composition:water of 1:10.

5. The device of claim 1 wherein the means for maintaining the amount of catalyst in the container comprises a backup capsule wherein the catalyst is introduced into a side of the container from an outlet of the capsule.

6. The device of claim 1 wherein the inlet and outlet are located on the top of the catalyst container.

* * * * *